United States Patent
West et al.

(10) Patent No.: US 12,045,726 B2
(45) Date of Patent: Jul. 23, 2024

(54) ADVERSARIALLY GENERATED COMMUNICATIONS

(71) Applicant: DeepSig Inc., Arlington, VA (US)

(72) Inventors: Nathan West, Washington, DC (US); Tamoghna Roy, Arlington, VA (US); Timothy J. O'Shea, Arlington, VA (US); Ben Hilburn, Reston, VA (US)

(73) Assignee: DeepSig Inc., Arlington, VA (US)

( * ) Notice: Subject to any disclaimer, the term of this patent is extended or adjusted under 35 U.S.C. 154(b) by 723 days.

(21) Appl. No.: 16/786,281

(22) Filed: Feb. 10, 2020

(65) Prior Publication Data

US 2020/0257985 A1 Aug. 13, 2020

Related U.S. Application Data

(60) Provisional application No. 62/802,730, filed on Feb. 8, 2019.

(51) Int. Cl.
*G06N 3/088* (2023.01)
*G06N 3/045* (2023.01)

(52) U.S. Cl.
CPC ............ *G06N 3/088* (2013.01); *G06N 3/045* (2023.01)

(58) Field of Classification Search
CPC ........ G06N 3/088; G06N 3/0454; G06N 3/02; G06N 3/084; H04L 1/0001; H04L 1/00;

(Continued)

(56) References Cited

U.S. PATENT DOCUMENTS 3,840,811 A * 10/1974 Blouch .................... H04B 1/50
379/93.28
6,311,065 B1 * 10/2001 Ushiki ................ H04W 36/324
455/437

(Continued)

OTHER PUBLICATIONS

J. Wang, Q. Gao, H. Wang, Y. Yu and M. Jin, "Time-of-Flight-Based Radio Tomography for Device Free Localization," in IEEE Transactions on Wireless Communications, vol. 12, No. 5, pp. 2355-2365, May 2013, doi: 10.1109/TWC.2013.040213.121001. (Year: 2013).*

(Continued)

*Primary Examiner* — Charles L Beard
(74) *Attorney, Agent, or Firm* — Fish & Richardson P.C.

(57) ABSTRACT

Methods, systems, and apparatus, including computer programs encoded on computer-storage media, for adversarially generated communication. In some implementations, first information is used as input for a generator machine-learning network. Information is taken from both the generator machine-learning network and target information that includes sample signals or other data. The information is sent to a discriminator machine-learning network which produces decision information including whether the information originated from the generator machine-learning network or the target information. An optimizer takes the decision information and performs one or more iterative optimization techniques which help determine updates to the generator machine-learning network or the discriminator machine-learning network. One or more rounds of updating the generator machine-learning network or the discriminator machine-learning network can allow the generator machine-learning network to produce information that is similar to the target information.

30 Claims, 7 Drawing Sheets

(58) Field of Classification Search
CPC ... H04L 1/0003; H04L 1/0006; H04L 1/0009; H04L 1/0017; H04L 5/00; H04L 5/0001; H04L 5/02; H04L 5/023; H04L 12/00; H04L 25/03; H04L 5/03057; H04L 43/08; H04L 43/0805; H04L 43/0823; H04L 43/0852; H04L 45/00; H04L 45/36; H04W 28/00; H04W 28/02; H04W 28/04; H04W 28/06; H04W 28/08; H04W 28/0815; H04W 28/0823; H04W 28/0967; H04W 28/0975; H04W 28/0983; H04W 28/10; H04W 28/12; H04W 28/14; H04W 28/16; H04W 40/00; H04W 40/26; H04W 40/28; H04B 17/391

See application file for complete search history.

(56) References Cited

U.S. PATENT DOCUMENTS

| Patent/Pub No. | Date | Name | Class |
|---|---|---|---|
| 8,948,298 B2* | 2/2015 | Lee | H04B 7/0478 370/335 |
| 10,305,766 B1* | 5/2019 | Zhang | G06N 3/044 |
| 10,429,486 B1* | 10/2019 | O'Shea | H04B 1/0003 |
| 10,581,469 B1* | 3/2020 | O'Shea | H04B 1/0475 |
| 11,070,410 B1* | 7/2021 | Ait Aoudia | G06N 3/04 |
| 11,137,289 B1* | 10/2021 | Poli | G06N 3/0675 |
| 11,184,783 B1* | 11/2021 | Melodia | G06N 3/084 |
| 11,334,807 B1* | 5/2022 | O'Shea | G06N 20/00 |
| 11,630,996 B1* | 4/2023 | O'Shea | G06N 3/0455 706/25 |
| 2003/0032445 A1* | 2/2003 | Suwa | H04M 1/72505 455/337 |
| 2007/0162819 A1* | 7/2007 | Kawamoto | H04L 1/0625 714/758 |
| 2008/0225791 A1* | 9/2008 | Pi | H04B 7/0632 370/329 |
| 2012/0069887 A1* | 3/2012 | Park | H04B 7/0626 375/224 |
| 2017/0118762 A1* | 4/2017 | Learned | H04W 24/00 |
| 2018/0144465 A1* | 5/2018 | Hsieh | G16H 30/40 |
| 2018/0302800 A1* | 10/2018 | O'Shea | H04W 16/18 |
| 2018/0308013 A1* | 10/2018 | OShea | G06N 3/086 |
| 2018/0314985 A1* | 11/2018 | OShea | G06N 3/045 |
| 2018/0322388 A1* | 11/2018 | OShea | H04L 1/0033 |
| 2018/0336471 A1* | 11/2018 | Rezagholizadeh | G06N 3/047 |
| 2018/0367192 A1* | 12/2018 | OShea | H04B 7/0413 |
| 2019/0149425 A1* | 5/2019 | Larish | G06N 3/045 706/16 |
| 2019/0188565 A1* | 6/2019 | OShea | H04L 1/0001 |
| 2019/0274108 A1* | 9/2019 | O'Shea | H04W 72/0453 |
| 2019/0319659 A1* | 10/2019 | Calabro | G06N 3/08 |
| 2019/0349037 A1* | 11/2019 | OShea | G06N 3/08 |
| 2020/0018815 A1* | 1/2020 | O'Shea | G01S 5/0215 |
| 2020/0068398 A1* | 2/2020 | Chakraborty | H04W 12/79 |
| 2020/0145842 A1* | 5/2020 | O'Shea | G06N 20/00 |
| 2020/0145951 A1* | 5/2020 | O'Shea | G06N 20/00 |
| 2020/0177418 A1* | 6/2020 | Hoydis | G06N 3/08 |
| 2020/0186227 A1* | 6/2020 | Reider | H04B 7/0695 |
| 2020/0213354 A1* | 7/2020 | Chakraborty | G06F 9/4416 |
| 2020/0252296 A1* | 8/2020 | Iashyn | H04L 41/16 |
| 2020/0257985 A1* | 8/2020 | West | G06N 3/045 |
| 2020/0265338 A1* | 8/2020 | OShea | G06N 3/082 |
| 2020/0334542 A1* | 10/2020 | Hoydis | G06F 17/18 |
| 2020/0334575 A1* | 10/2020 | OShea | G06N 3/082 |
| 2020/0343985 A1* | 10/2020 | OShea | G06N 3/08 |
| 2020/0389371 A1* | 12/2020 | Tedaldi | G06N 20/00 |
| 2021/0027159 A1* | 1/2021 | Huang | G06N 3/08 |
| 2021/0028885 A1* | 1/2021 | Huang | H04L 1/0045 |
| 2021/0028973 A1* | 1/2021 | Côté | H04J 3/1652 |
| 2021/0084601 A1* | 3/2021 | Rofougaran | G06N 3/045 |
| 2021/0119681 A1* | 4/2021 | Seo | G06F 18/24133 |
| 2021/0133577 A1* | 5/2021 | Srinivasan | G06N 20/00 |
| 2021/0166705 A1* | 6/2021 | Chang | G10L 19/038 |
| 2021/0273857 A1* | 9/2021 | Larish | G06N 3/047 |
| 2021/0281356 A1* | 9/2021 | Perez-Ramirez | H04W 28/04 |
| 2021/0326725 A1* | 10/2021 | Payton | H04K 3/94 |
| 2021/0406677 A1* | 12/2021 | Wang | H04W 84/18 |
| 2022/0045727 A1* | 2/2022 | Mehta | H04B 17/391 |
| 2022/0059107 A1* | 2/2022 | Mustafa | G06N 3/088 |
| 2022/0138911 A1* | 5/2022 | Newey | G06N 3/08 382/100 |
| 2022/0174634 A1* | 6/2022 | O'Shea | G06N 3/084 |
| 2022/0182175 A1* | 6/2022 | Kvernvik | H04L 1/0009 |
| 2022/0215504 A1* | 7/2022 | Moens | G06N 3/047 |
| 2022/0217792 A1* | 7/2022 | Yu | G06N 3/044 |
| 2022/0231912 A1* | 7/2022 | Jeong | G06N 3/08 |
| 2022/0255775 A1* | 8/2022 | D'Oro | G06N 3/045 |
| 2022/0278728 A1* | 9/2022 | Vankayala | H04B 7/0417 |
| 2022/0303158 A1* | 9/2022 | Alesiani | H04L 25/03178 |
| 2022/0357415 A1* | 11/2022 | Wu | G06N 3/084 |
| 2023/0010095 A1* | 1/2023 | Alabbasi | H04L 41/145 |
| 2023/0010164 A1* | 1/2023 | Cowan | G06T 3/4053 |
| 2023/0074968 A1* | 3/2023 | Gookin | G06N 3/08 |
| 2023/0094630 A1* | 3/2023 | Zhang | G06V 10/82 704/226 |
| 2023/0155704 A1* | 5/2023 | Orekondy | H04L 41/145 370/329 |
| 2023/0178084 A1* | 6/2023 | Biswas | G06N 3/045 704/500 |
| 2024/0021210 A1* | 1/2024 | Biswas | G10L 21/0208 |
| 2024/0056336 A1* | 2/2024 | Zirwas | H04L 25/0204 |

OTHER PUBLICATIONS

T. Feigl, T. Nowak, M. Philippsen, T. Edelhäußer and C. Mutschler, "Recurrent Neural Networks on Drifting Time-of-Flight Measurements," 2018 International Conference on Indoor Positioning and Indoor Navigation (IPIN), Nantes, France, 2018, pp. 206-212, doi: 10.1109/IPIN.2018.8533813. (Year: 2018).*

T. O'Shea and J. Hoydis, "An Introduction to Deep Learning for the Physical Layer," in IEEE Transactions on Cognitive Communications and Networking, vol. 3, No. 4, pp. 563-575, Dec. 2017, doi: 10.1109/TCCN.2017.2758370. (Year: 2017).*

* cited by examiner

ADVERSARIALLY GENERATED COMMUNICATIONS

CROSS-REFERENCE TO RELATED APPLICATION

This application claims the benefit of U.S. Provisional Application No. 62/802,730, filed on Feb. 8, 2019, which is incorporated herein by reference.

TECHNICAL FIELD

This specification generally relates to communications systems that use machine learning.

BACKGROUND

Communications systems involve transmitting and receiving various types of communication media, e.g., over the air, through fiber optic cables or metallic cables, under water, or through outer space. In some cases, communications channels use radio frequency (RF) waveforms to transmit information that is modulated onto one or more carrier waveforms operating at RF frequencies. In other cases, RF waveforms are themselves information, such as outputs of sensors or probes. Information that is carried in RF waveforms, or other communication channels, is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to generate, using a generator machine-learning network, communications signals, which are then communicated over a communications channel, and specifically to generate signals which share characteristics with one or more preexisting signals. The one or more preexisting signals can be used as input to train the generator machine-learning network.

The methods, apparatuses, and systems realize a generative adversarial network (GAN)-based communications system. In this context, a GAN refers to a system in which a generator machine-learning network (for example, an artificial neural network) generates a product which is evaluated by a discriminator machine-learning network (for example, another artificial neural network). The generator machine-learning network updates its output with successive evaluations by the discriminator machine-learning network. By updating the output in this manner, the generator machine-learning network can yield refined communications signals that are indistinguishable from target communications signals, as described in detail below.

In one aspect, a method is performed by at least one processor to train at least one machine-learning network to generate information used to communicate over a communications channel. In some cases, the communications channel can be a form of radio frequency (RF) communications channel. The method includes: determining first information to be used as input for a generator machine-learning network; determining target information to be used for training at least one of the generator machine-learning network or a discriminator machine-learning network that is communicably coupled to the generator machine-learning network, where the generator machine-learning network and the discriminator machine-learning network are used for communications over the communications channel; generating second information by using one of (i) the generator machine-learning network to process the first information and generate the second information as a function of the first information, or (ii) the target information; sending the second information to the discriminator machine-learning network; generating discriminator information by processing the transferred second information using the discriminator machine-learning network, where generating the discriminator information includes performing a determination by the discriminator machine-learning network whether the transferred second information originated from the generator machine-learning network or the target information; sending, to an optimizer, decision information indicating the determination performed by the discriminator machine-learning network; processing, using the optimizer, the decision information using one or more iterative optimization techniques; and updating at least one of the generator machine-learning network or the discriminator machine-learning network based on the optimizer processing the discriminator information and results of the one or more iterative optimization techniques. Other implementations of this aspect include corresponding computer systems, apparatus, and computer programs recorded on one or more computer storage devices, each configured to cause at least one operably connected processor to perform the actions of the methods.

Implementations may include one or more of the following features. The one or more iterative optimization techniques may include a stochastic gradient descent (SGD) or Adam optimization algorithm. The transferred second information may be an altered version of the second information that is obtained by processing the second information using either a real or simulated communications channel. Processing the secondary information may include modulation, digital to analog conversion, amplification, frequency mixing, filtering, wireless or wired channel propagation effects, noise, analog to digital conversion, change of modulation basis, or other traditional processing, modulation, or coding operations.

The method may further include: deploying the generator machine-learning network in a communications system in conjunction with signal encoding performed by an encoder machine-learning network; determining an objective function using a measure of distance between input information to the encoder machine-learning network and output information produced from a decoder machine-learning network that is communicably coupled to the encoder machine-learning network, where the output information is produced as a function of a transmission received from the encoder machine-learning network, the transmission being based on the input information; calculating a rate of change of the objective function relative to variations in at least one of the encoder machine-learning network or the decoder machine-learning network; selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network. The encoder machine-learning network and the decoder machine-learning network may be jointly trained as an auto-encoder to learn communications over a communications channel, and the auto-encoder may include at least one channel-modeling layer representing effects of the communications channel on transmitted waveforms. The communications channel may include at least one of a radio communications channel, an acoustic communications channel, or an optical communications channel. Updating at least one of the generator machine-learning network or the discriminator machine-learning network may include at least one of: updating at least one generating network weight or network connectivity in one or more layers of the generator machine-learning network, or updating at least one discriminating network weight or network connectivity in one or more layers of the discriminator machine-learning network. At least one of the generator machine-learning network or the discriminator machine-learning network may include at least one of a deep dense neural network (DNN), a convolutional neural network (CNN), or a recurrent neural network (RNN) including parametric multiplications, additions, and non-linearities. The generator machine-learning network may be trained to generate at least one of 4th Generation Long-term Evolution (4G LTE), 5th Generation New Radio (5G NR), or 6th Generation (6G) cellular communications signals, Wi-Fi signals, satellite signals, auditory signals, visual signals, or radar signals.

In another aspect, a method includes transmitting and receiving information through a communications channel. In some cases, the communications channel can be a form of radio frequency (RF) communications channel. The method includes: determining first information to be used as input for a generator machine-learning network; determining target information to be used for training at least one of the generator machine-learning network or a discriminator machine-learning network that is communicably coupled to the generator machine-learning network, where the generator machine-learning network and the discriminator machine-learning network are used for communications over the communications channel; generating second information by using one of (i) the generator machine-learning network to process the first information and generate the second information as a function of the first information, or (ii) the target information; sending the second information to the discriminator machine-learning network; generating discriminator information by processing the transferred second information using the discriminator machine-learning network, where generating the discriminator information includes performing a determination by the discriminator machine-learning network whether the transferred second information originated from the generator machine-learning network or the target information; sending, to an optimizer, decision information indicating the determination performed by the discriminator machine-learning network; processing, using the optimizer, the decision information using one or more iterative optimization techniques; and updating at least one of the generator machine-learning network or the discriminator machine-learning network based on the optimizer processing the discriminator information and results of the one or more iterative optimization techniques. Other implementations of this aspect include corresponding computer systems, apparatus, and computer programs recorded on one or more computer storage devices, each configured to cause at least one operably connected processor to perform the actions of the methods.

Implementations may include one or more of the following features. The one or more iterative optimization techniques may include a stochastic gradient descent (SGD) or Adam optimization algorithm. The transferred second information may be an altered version of the second information that is obtained by processing the second information using either a real or simulated communications channel. Processing the secondary information may include modulation, digital to analog conversion, amplification, frequency mixing, filtering, wireless or wired channel propagation effects, noise, analog to digital conversion, change of modulation basis, or other traditional processing, modulation, or coding operations.

The method may further include: deploying the generator machine-learning network in a communications system in conjunction with signal encoding performed by an encoder machine-learning network; determining an objective function using a measure of distance between input information to the encoder machine-learning network and output information produced from a decoder machine-learning network that is communicably coupled to the encoder machine-learning network, where the output information is produced as a function of a transmission received from the encoder machine-learning network, the transmission being based on the input information; calculating a rate of change of the objective function relative to variations in at least one of the encoder machine-learning network or the decoder machine-learning network; selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network. The encoder machine-learning network and the decoder machine-learning network may be jointly trained as an auto-encoder to learn communications over a communications channel, and the auto-encoder may include at least one channel-modeling layer representing effects of the communications channel on transmitted waveforms. The communications channel may include at least one of a radio communications channel, an acoustic communications channel, or an optical communications channel. Updating at least one of the generator machine-learning network or the discriminator machine-learning network may include at least one of: updating at least one generating network weight or network connectivity in one or more layers of the generator machine-learning network, or updating at least one discriminating network weight or network connectivity in one or more layers of the discriminator machine-learning network. At least one of the generator machine-learning network or the discriminator machine-learning network may include at least one of a deep dense neural network (DNN), a convolutional neural network (CNN), or a recurrent neural network (RNN) including parametric multiplications, additions, and non-linearities. The generator machine-learning network may be trained to generate at least one of 4th Generation Long-term Evolution (4G LTE), 5th Generation New Radio (5G NR), or 6th Generation (6G) cellular communications signals, Wi-Fi signals, satellite signals, auditory signals, visual signals, or radar signals.

Another aspect involves a system including: at least one processor; and at least one computer memory coupled to the at least one processor having stored thereon instructions which, when executed by the at least one processor, cause the at least one processor to perform operations including: determining first information to be used as input for a generator machine-learning network; determining target information to be used for training at least one of the generator machine-learning network or a discriminator machine-learning network that is communicably coupled to the generator machine-learning network, where the generator machine-learning network and the discriminator machine-learning network are used for communications over the communications channel; generating second information by using one of (i) the generator machine-learning network to process the first information and generate the second information as a function of the first information, or (ii) the target information; sending the second information to the discriminator machine-learning network; generating discriminator information by processing the transferred second information using the discriminator machine-learning network, where generating the discriminator information includes performing a determination by the discriminator machine-learning network whether the transferred second information originated from the generator machine-learning network or the target information; sending, to an optimizer, decision information indicating the determination performed by the discriminator machine-learning network; processing, using the optimizer, the decision information using one or more iterative optimization techniques; and updating at least one of the generator machine-learning network or the discriminator machine-learning network based on the optimizer processing the discriminator information and results of the one or more iterative optimization techniques. Other implementations of this aspect include corresponding computer systems, apparatus, and computer programs recorded on one or more computer storage devices, each configured to cause at least one operably connected processor to perform the actions of the methods.

Implementations may include one or more of the following features. The one or more iterative optimization techniques may include a stochastic gradient descent (SGD) or Adam optimization algorithm. The transferred second information may be an altered version of the second information that is obtained by processing the second information using either a real or simulated communications channel. Processing the secondary information may include modulation, digital to analog conversion, amplification, frequency mixing, filtering, wireless or wired channel propagation effects, noise, analog to digital conversion, change of modulation basis, or other traditional processing, modulation, or coding operations.

The operations may further include: deploying the generator machine-learning network in a communications system in conjunction with signal encoding performed by an encoder machine-learning network; determining an objective function using a measure of distance between input information to the encoder machine-learning network and output information produced from a decoder machine-learning network that is communicably coupled to the encoder machine-learning network, where the output information is produced as a function of a transmission received from the encoder machine-learning network, the transmission being based on the input information; calculating a rate of change of the objective function relative to variations in at least one of the encoder machine-learning network or the decoder machine-learning network; selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network. The encoder machine-learning network and the decoder machine-learning network may be jointly trained as an auto-encoder to learn communications over a communications channel, and the auto-encoder may include at least one channel-modeling layer representing effects of the communications channel on transmitted waveforms. The communications channel may include at least one of a radio communications channel, an acoustic communications channel, or an optical communications channel. Updating at least one of the generator machine-learning network or the discriminator machine-learning network may include at least one of: updating at least one generating network weight or network connectivity in one or more layers of the generator machine-learning network, or updating at least one discriminating network weight or network connectivity in one or more layers of the discriminator machine-learning network. At least one of the generator machine-learning network or the discriminator machine-learning network may include at least one of a deep dense neural network (DNN), a convolutional neural network (CNN), or a recurrent neural network (RNN) including parametric multiplications, additions, and non-linearities. The generator machine-learning network may be trained to generate at least one of 4th Generation Long-term Evolution (4G LTE), 5th Generation New Radio (5G NR), or 6th Generation (6G) cellular communications signals, Wi-Fi signals, satellite signals, auditory signals, visual signals, or radar signals.

In some implementations, information can be learned to take on new signal properties through the use of a machine learning model. The machine learning model may be trained using a form of a GAN. The machine-learning model may be trained to produce communications signals that are indiscernible from another set of signals taken from a target information source. For example, the GAN-based machine-learning network model can be paired with a communications signal encoder, to generate a radio signal that matches a desired spectral mask, and existing standard or appearance, or other signal properties from a target information source. The generated artificial signal can be encoded into an encoded signal by an encoder machine-learning based module. The encoded signal can be decoded by a decoder machine-learning based module. Both the encoder and decoder automatically adjust communications encoding and decoding based on noise, or other communications disturbances. In this way, communications efficiency can be improved.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
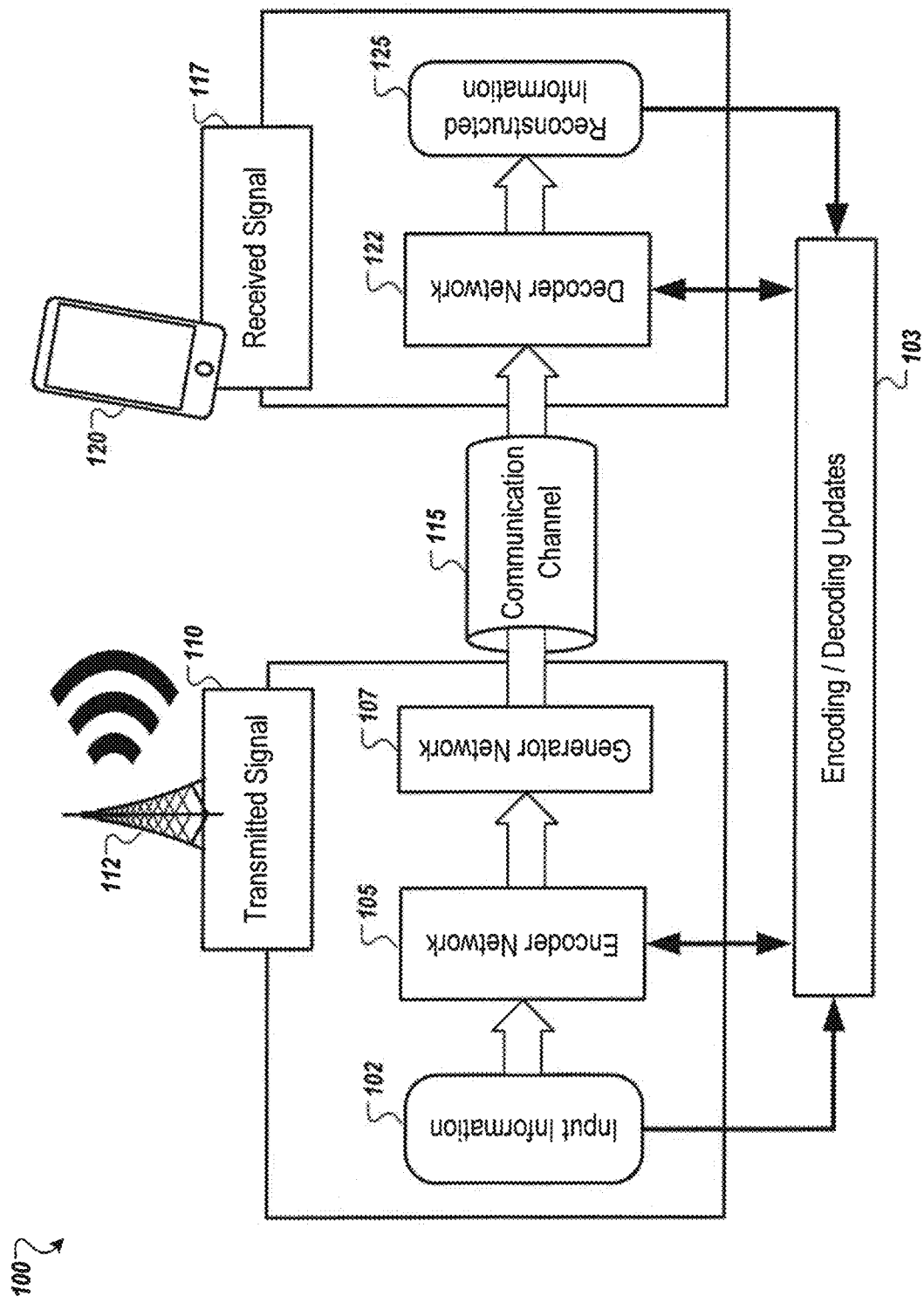
FIG. 1 is a diagram showing an example of a system for adversarially generated communications.

The disclosed implementations present an approach for generating communications signals that can be used for encoding, transmitting, receiving, and decoding network information, while also taking on desired signal properties, structure or appearances, or other properties that can improve its function, such as spectral shaping, structure, interoperability, and performance of learned communications systems. The system uses a generator function that maps a latent space into a generated space. The latent space, in some implementations, represents random values sampled from a distribution, such as a set of uniform or Gaussian distributions and can take the form of a vector. The system allows for learning of a generator that may follow a number of different generation objective functions.

The training of a generator machine-learning network or a discriminator machine-learning network may be designed to achieve various communications systems objectives, such as low bit error rate, low power, low bandwidth, high information density, low complexity, low energy density, performing well in particular regimes such as at a low signal to noise (SNR) ratio or under specific types of channel fading or interference, and/or other criteria. The results of training such machine-learning networks may then be utilized to deploy real-world generators in communications scenarios to generate information over various types of communications media. In some implementations, further learning and adaptation of the generator are implemented during deployment, based on feedback information. These generators may replace or augment one or more signal processing functions such as modulation, demodulation, mapping, error correction, spreading, encoding, or other components in existing communications systems.

The training can also take place at an encoder or decoder within a system that includes a generator machine-learning network. By doing so, the encoder or decoder can be designed to achieve more efficient and/or robust communications channels, for example, for evaluating the encoding and/or decoding performance against some loss metric and using the loss metric to update the encoding and/or decoding process for example through a method like stochastic gradient descent. In some cases, the encoder or the decoder can be designed together with a generator to achieve the various objectives for the encoder, decoder or the generator.

The disclosed implementations present a novel approach to how communications systems are designed and deployed for communications applications. For example, by implementing machine-learning networks that are trained to learn new communications signals through an adversarial mechanism, the implementations improve a typically slow and incremental process (that can often include manual signal processing algorithm design, which can take months or years) of signal processing engineering, enabling a paradigm shift in designing, constructing, and using communications systems. The disclosed implementations further help provide an efficient and robust method of generating particular communications signals for transmission from one party to another. The disclosed techniques offer various other advantages, such as improved power, resiliency, greater efficiency, and complexity advantages over presently available systems. This can be useful for communications channels which are congested, monitored, have very complex sets of effects that are hard to model, or hard to optimize for using other approaches.

The disclosed implementations can further combine elements of the generator machine-learning network with elements of machine-learning encoder or decoder networks for different types of communications media. The combination can enable one or more of the advantages listed above.

Implementations disclosed herein may be applied to a wide range of radio communications systems, such as cellular, satellite, optical, acoustic, physical, emergency handheld, broadcast, point-to-point, Wi-Fi, Bluetooth, and other forms of radio frequency communications. Signals may suffer channel impairments. Channel impairments may include, for example, thermal noise, such as Gaussian-like noise, non-whitened noise, or more complex impairments such as multi-path fading, impulse noise, spurious or continuous jamming, interference, distortion, hardware effects, and other impairments.

The generator may implement generating techniques that are learned from one or more machine-learning networks that have been trained to learn suitable output based on one or more objective criteria. For example, the machine-learning networks may be artificial neural networks. During training, the machine-learning networks may be adapted through selection of model architecture, weights, and parameters in the generator and/or the discriminator. The generator and discriminator machine-learning networks may be trained jointly or may be trained iteratively.

For example, a generator machine-learning network and discriminator machine-learning network may be jointly optimized or iteratively optimized. In some implementations, the one or more machine-learning networks may be trained by modeling the effects of an impaired channel as one or more channel-modeling layers, such as stochastic layers which may include regularization layers (e.g. regularization layers, transforming layers, variational layers/samplers, noise layers, mixing layers, etc.) in the one or more machine-learning networks or as another set of differentiable functions representing the behavior of a wireless channel. The layers that model the channel may form a regularization function across random behavior of a channel.

During training, a generator machine-learning network and discriminator machine-learning network may be trained to perform supervised, unsupervised, or partially supervised, machine learning to determine techniques for transmitting and receiving information over a communications channel. Therefore, in some scenarios, rather than being reliant upon pre-designed systems for target information, error correction, modulation, pre-coding, and shaping, the disclosed implementations herein may adaptively learn techniques for generating signals over a channel. The generator machine-learning network may be trained on real or simulated data, often exploiting measurement data for accuracy in training target data. Generators that utilize results of training such machine-learning networks may further be updated during deployment, thus providing advantages in adapting to different types of wireless system requirements, and in some cases improving the throughput, error rate, complexity, and power consumption performance of such systems.

As such, regardless of the type of communications channel, implementations disclosed herein can provide broadly applicable techniques for learning representations of information that enable reliable communications over the communications channels. Depending on the configuration of the training system and data sets and channel models used, such machine-learning communications techniques can specialize in performance for a narrow class of conditions, signal or channel types, or may generalize and optimize performance for a wide range of signal or channel types or mixtures of one or more signals or channels.

FIG. 1 illustrates an example of a communications system 100. The system 100 includes a transmission component having input information 102, encoding/decoding updates 103, an encoder network 105, a generator network 107, a transmitted signal 110, and a transmission device 112; a communications channel 115; and a reception component having received signal 117, a receiving device 120, a decoder network 122, and reconstructed information 125.

In some implementations, the generator network 107 has been trained previously and used to generate signals for transmission. In some cases, the communications system 100 can be a cellular network used to transmit a signal from a base station to a user equipment. The communications system 100 can also be used to transmit a signal from the user equipment to the base station. The user equipment can, in some cases, be a smartphone, cellphone, or laptop.

In some implementations, the encoder network 105 and the decoder network 122 are optionally added to the generation of the transmission signal by the generator network 107. Furthermore, if the encoder network 105 and decoder network 122 are used for communications, the communications may or may not result in the encoding/decoding updates 103. In some cases, the encoding/decoding updates 103 are ignored by the encoder network 105 or the decoder network 122. In some cases, the encoding/decoding updates 103 are not generated. In some cases, the encoder network 105 or the decoder network 122 is the result of training performed prior to the system 100 communicating one or more signals.

In some implementations that are used for training, the generator network 107 includes a machine-learning network that learns how to represent first information, which is discussed below. In the system 100, the first information originates from the encoder network 105. During training, a discriminator network that also includes a machine-learning network helps train the generator network 107 how to produce signals that share traits and features with target information. Further details on the training process are described below, for example with reference to FIG. 2 and FIG. 3.

In scenarios of training, the encoder network 105 includes a machine-learning network that learns how to represent the input information 102. Analogously, during training, the decoder network 122 includes a machine-learning network that learns how to decode a received signal into reconstructed information 125 that approximates the original input information 102. During training, the encoder 105 and/or decoder 122 may be trained by a network update process, for example, the encoding/decoding updates 103. The encoder 105 and decoder 122 may be trained to achieve various types of objective functions, such as a measure of reconstruction error, a measure of computational complexity, bandwidth, latency, power, or various combinations thereof and other objectives.

In some implementations of deployment, the generator network 107 implements signal generation techniques that were previously learned from training, or may be (further) trained during deployment. The generator 107 may be deployed in various application scenarios to perform communications, using the information representations that were learned during training. In some implementations, the generator 107 is further updated during deployment based on real-time performance results such as construction error, power consumption, delay, etc. Further details of deployment are described below. Error feedback of distance minimization may occur in some instances via a communications bus, or a protocol message within the system 100 which can be used to update the generator 107.

In scenarios of deployment, the encoder 105 and decoder 122 may implement encoding and decoding techniques that were previously learned from training, or may be (further) trained during deployment. The encoder 105 and decoder 122 may be deployed in various application scenarios to perform communications, using the encoding and decoding representations that were learned during training. In some implementations, the encoder 105 and/or decoder 122 may be further updated during deployment based on real-time performance results such as reconstruction error, power consumption, delay, etc. In these cases, error feedback of loss functions may occur in some instances via a communications bus, or a protocol message within the wireless system which can be used to update the encoder 105 and/or decoder 122.

The input information 102 and reconstructed information 125 may be any suitable form of information that is to be communicated over a channel, such as a stream of bits, packets, images, discrete-time signals, or continuous-time waveforms. Implementations disclosed herein are not limited to any particular type of input information 102 and reconstructed information 125, and are generally applicable to generating techniques for communicating a wide variety of types of information over the communications channel 115.

In some implementations, the encoder network 105 or the decoder network 122 is a neural network (e.g. deep neural networks (DNN), convolutional neural networks (CNN), recurrent neural networks (RNN), residual neural network, (ResNet), echo state networks (ESN), graph neural networks, variational neural networks, etc.). In some implementations, either or both the encoder network and the decoder network are another form of machine-learning network, e.g., where they take some input, include a set of encoder parameters or decoder parameters, as applicable, and produce some output information. Optimized architectures may vary but retain the form of a directed computation graph of neurons, parameters, and intermediate values producing an output.

The encoder network 105 is used to produce first information from the input information 102. The first information can be used as input in a latent space to the generator network 107 to produce second information that can be transmitted as the transmitted signal 110 by the transmitting device 112. The transmitted signal 110 may be a signal covering a subset of the latent space used by the generator network 107. The transmitted signal 110 may be similar to, or share certain characteristics with, one or more signals used to train the generator network 107. Further discussion of training the generator network 107 is provided with respect to FIG. 2 and FIG. 3. In some instances, the encoder network and the generator network may be combined or trained jointly in arbitrary order where both functions exists but are less distinct or ordered.

As shown, the transmitted signal 110 is transmitted over the communications channel 115. The transmitted signal 110 is received as the received signal 117 by the receiving device 120. The decoder network 122 may decode the received signal 117 and produce the reconstructed information 125. Both the input information 102 and the reconstructed information 125 can be used to determine encoding/decoding updates 103 in instances where the encoder network 105 or the decoder network 122 is being trained or updated. The communications system 100 can perform with or without determining updates for the encoder network 105 or the decoder network 122.

In some cases, the encoder network 105 or the decoder network 122 can be replaced with traditional signal processing operations. For example, the encoder network 105 can be replaced with a traditional quadrature amplitude (QAM) or phase-shift keying (PSK) modulation, and in some cases this may additionally include error correction encoding, or other forms of information processing traditionally used in non-learned communications systems. In these cases, the encoder network may provide additional shaping, refinement, processing, or augmentation to the traditional non-learned signal processing stages.

The encoder network 105 and the generator network 107 can optionally incorporate additional processing stages, such as modulation, Fourier transforms, wavelet transforms, mapping onto alternate basis functions or representations, filtering, shaping, analog to digital conversion, amplification, among others. In these cases, the learning may provide additional augmentation, shaping or changing in representation, while also retaining existing well known representations or encodings for portions of the modem encoding process.

In some implementations, the generator network 107 use a simulated or modeled communications channel instead of the real communications channel 115. A simulated or modeled communications may include transmitter/receiver effects, such as filtering impairments, additive noise, and simulation of a range of propagation effects such as fading, path simulation, dispersion, interference, distortion, generative adversarial channel modeling, or other impairments in the transmitter and/or receiver components.

In some implementations, the encoder 105 and decoder 122 employ one or more signal processing operations, which are suited to the type of communications domain. As examples, the encoder 105 and/or decoder may implement filtering, modulation, analog-to-digital (A/D) or digital-to-analog (D/A) conversion, equalization, or other signal processing methods that may be suitable for a particular types of RF signals or communications domains. In some implementations, the encoder 105 and/or decoder 122 implement one or more transmit and receive antennas, and other hardware or software suitable for transmitting and receiving signals over the communications channel 115.

In some cases, the transmitted signal 110 and received signal 117 represent actual RF waveforms that are transmitted and received over the communications channel 115 using one or more antennas. The communications channel 115 may represent an RF channel in such cases, e.g., a wireless cellular network channel (e.g. a single input single output (SISO) or multiple input multiple output (MIMO) 4G, 5G or 6G base station or user equipment propagation channel), a Wi-Fi channel, IoT channel, or an industrial device channel among others.

In some implementations, the system 100 implements signal processing and RF transmission/reception processes separately from the generator 107. In such implementations, one or more signal transmission and/or signal reception components, such as filtering, modulation, A/D or D/A conversion, single or multiple antennas, etc., are represented as part of the communications channel 115. The communications channel 115 may therefore include transmitter/receiver effects, such as filtering impairments, additive noise, or other impairments in the transmitter and/or receiver components. Therefore, in such scenarios, the transmitted signal 110 and received signal 117 represent intermediate representations of information 102/125, and the channel 115 represents a general transformation of those intermediate representations of information to and from actual RF waveforms that are transmitted and received over an RF medium. For example, the transmitted signal 110 and received signal 117 may represent basis coefficients for RF waveforms, time-domain samples of RF waveforms, distributions over RF waveform values, or other intermediate representations that may be transformed to and from RF waveforms.

In scenarios of training, the reconstructed information 125 may be compared with the input information 102, and the encoder 105 and/or the decoder 122 may be trained (updated) based on results of the reconstruction. In some implementations, updating the encoder 105 and/or decoder 122 may also be based on other factors, such as computational complexity of the machine-learning networks (which can be measured, for example, by the number of parameters, number of multiplies/adds, execution time, Kolmogorov complexity, or otherwise), transmission bandwidth or power used to communicate over the channel 115, or various combinations thereof and other metrics.

In some implementations, the encoder 105 and the decoder 122 include artificial neural networks that consist of one or more connected neurons or layers of parametric multiplications, additions, and non-linearities. In such scenarios, updating the encoder 105 and/or decoder 122 may include updating weights of the neural network layers, updating connectivity in the neural network layers, or other modifications of the neural network architecture, so as to modify a mapping of inputs to outputs.

The encoder 105 and the decoder 122 may be configured to encode and decode using any suitable machine-learning technique. In general, the encoder 105 may be configured to learn a mapping from input information 102 into a lower-dimensional or higher-dimensional representation as the transmitted signal 110. Analogously, the decoder 122 may be configured to learn a reverse mapping from a lower-dimensional or higher-dimensional received signal 117 into the reconstructed information 125

As an example, the mappings that are implemented in the encoder 105 and decoder 122 may involve learning a set of basis functions for RF signals. In such scenarios, for a particular set of basis functions, the encoder 105 may transform the input information 102 into a set of basis coefficients corresponding to those basis functions, and the basis coefficients may then be used to generate a transmitted RF waveform (for example, by taking a weighted combination of the basis functions weighted by the basis coefficients). Analogously, the decoder 122 may generate the reconstructed information 125 by generating a set of basis coefficients from a received RF waveform (for example by taking projections of the received RF waveform onto the set of basis functions). The basis functions themselves may be any suitable orthogonal or non orthogonal set of basis functions, subject to appropriate constraints on energy, amplitude, bandwidth, or other conditions.

During deployment, in some implementations, the encoder 105 and/or decoder 122 utilize simplified encoding and decoding techniques based on results of training machine-learning networks. For example, the encoder 105 and/or decoder 122 may utilize approximations or compact look up tables based on the learned encoding/decoding mappings. In such deployment scenarios, the encoder 105 and/or decoder 122 may implement more simplified structures, rather than a full machine-learning network. For example, techniques such as distillation may be used to train smaller machine-learning networks which perform the same signal processing function In some implementations, the encoder 105 and/or decoder 122 may include one or more fixed components or algorithms that are designed to facilitate communications over communications channels, such as expert synchronizers, equalizers, etc. As such, during training, the encoder 105 and/or decoder 122 may be trained to learn encoding/decoding techniques that are suitable for such fixed components or algorithms.

In some cases, the generator network 107 can transmit a signal without using the encoder network 105 or the decoder network 122.

In situations where RF signals are transmitted and received by system 100, the RF signals may include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

The communications channel 115 can be used to transport information embedded within a signal. The embeddings of information can include any of the following: image embedding, video embedding, audio embedding, optical embedding, or other form of embedding.

Figure 2:
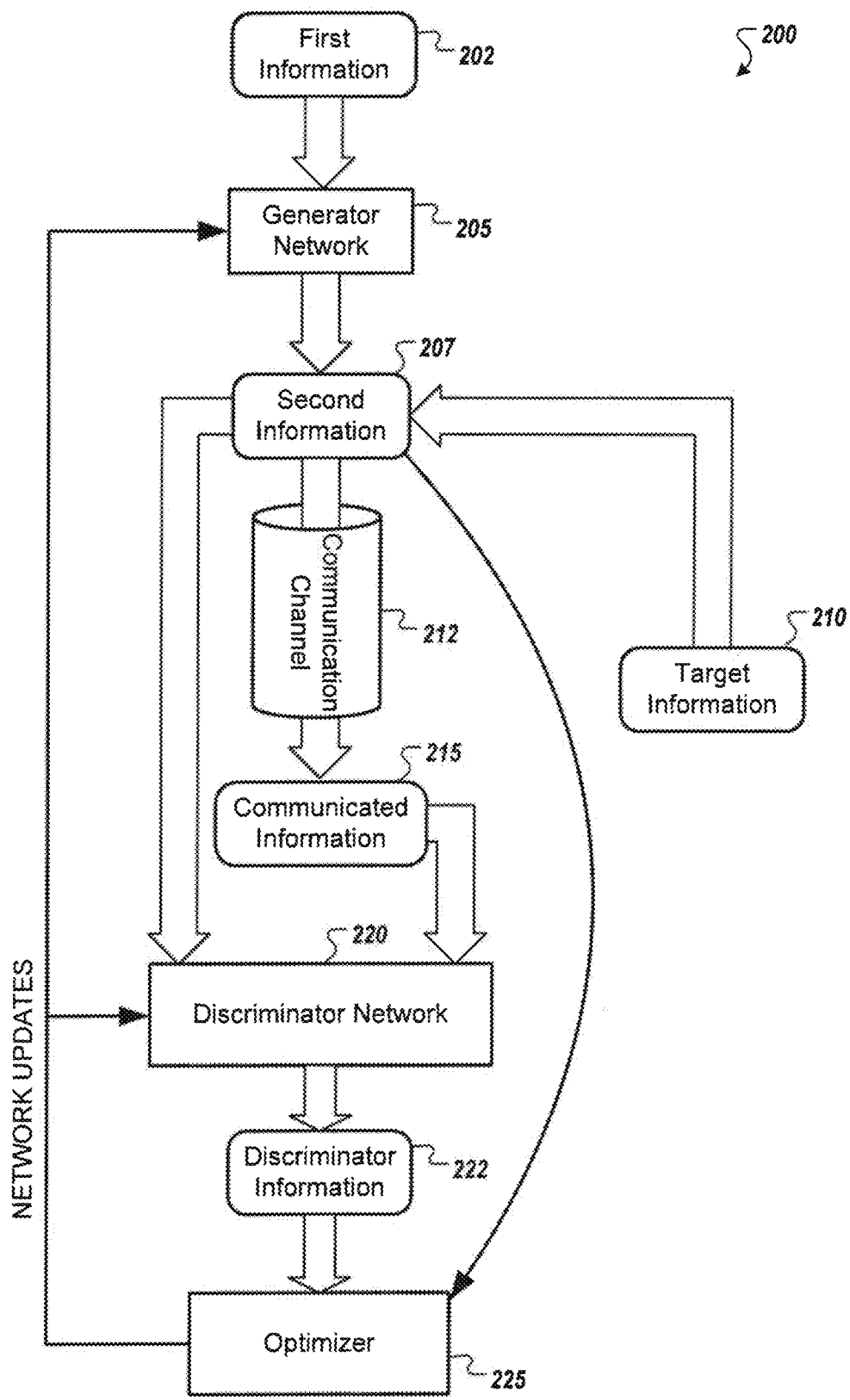
FIG. 2 is a diagram showing an example of a system for training a generator machine-learning network.

FIG. 2 illustrates an example of a system 200 for training a generator machine-learning network 205. In some implementations, the system 200 is used to train the generator machine-learning network 107 of FIG. 1. The system 200 includes first information 202, the generator network 205, second information 207, target information 210, a communications channel 212, communicated information 215, a discriminator network 220, discriminator information 222, and an optimizer 225.

The generator network 205 is trained adversarially by using the discriminator network 220 and the target information 210. Parameters of both the generator network 205 and the discriminator network 220 are optimized.

The first information 202 is used as input for the generator network 205. The generator network 205 produces the second information 207 using learned techniques, the first information 202, and the target information 210. The first information 207 may represent a list of all possible values of an n-dimensional vector 'z'. In some implementations, 'z' represents random values sampled from a distribution (e.g., uniform distribution, Gaussian distribution, etc.).

In some implementations, the generator network 205 is a neural network (e.g., a deep neural network (DNN), multi-layer perceptron (MLP), convolutional neural network (CNN), recurrent neural network (RNN) a network formed at least in part from one or more of these types of layers, similar parametric network of neural network-like matrix operations, etc.). In some cases, the generator network 205 is a variational neural network that takes an input, the first information 202, and maps it to an output, the second information 207, either deterministically, based on parameters within the generator network 205 or stochastically where one or more additional random sampling procedures within the generator network 205 (e.g., variational generator network features) are used to make the network non-deterministic, but shape the distribution. The generator produces values of the second information 207 within the space of all possible values of the second information 207.

The second information 207 may be formed from outputs of the generator network 205, or it may be sampled from the target information source 210, (e.g., examples of a communications signal, simulations of various signals, samples from a closed form distribution over possible values of the second information 207, masked or shaped signals which may represent some desired set of signal properties, etc.).

In some implementations, the communicated information 215 is produced by transmitting the second information through the real or simulated communications channel 212. In some implementations, this includes one or more of the following steps in hardware and propagation: digital to analog conversion, amplification, frequency mixing, filtering, wireless or wired channel propagation effects, noise, or analog to digital conversion. In some implementations, producing the communicated information 215 by transmitting the second information through the real or simulated communications channel 212 also includes additional processing steps, such as change of modulation basis, or other traditional signal processing or modulation or coding operations. The communicated information 215 then represents an altered version of the second information 207, which has been modified by the real or simulated effects of one or more target communications channels.

The discriminator machine learning network 220, leverages at least one of the second information 207 or the communicated information 215 to produce the discrimination network 220, which includes at least a decision on whether the second information 207 came from the target information 210 source or the generator network 205. The discriminator 220 includes a set of parameters which control the discriminator information 222 output.

The source of the target information 210, or another oracle, can provide label information of the second information 207 to the optimizer 225. This information can be used to indicate if the second information 207 came from the target information 210 or is a product of the generator network 205.

The optimizer 225 uses an iterative optimization technique, such as stochastic gradient descent (SGD) or another form, such as Adam, to update one or more network weights within the discriminator network 220 or the generator network 205. Approximations, such as variational methods or adversarial approximations, can be used to assist in this optimization, e.g., by approximating the gradient of the communications channel 212 to facilitate forwards passes (computing communicated information 215 from second information 207), or backwards passes (computing a gradient which depends in part on the change of the communicated information 215 over the second information 207).

The generator network 205, with respect to FIG. 2, can be used to produce simulations of radio phenomena, such as signals, emissions, interference, multi-user behavior, protocols, or other radio events, which may otherwise be difficult, expensive, computationally complex, or hard to simulate through a traditional procedural approach. There are multiple applications in test and measurement, verification, interference testing, research and simulation where such a generator network can be leveraged, either in software simulation or in connection with signal generation over radio hardware.

Figure 3:
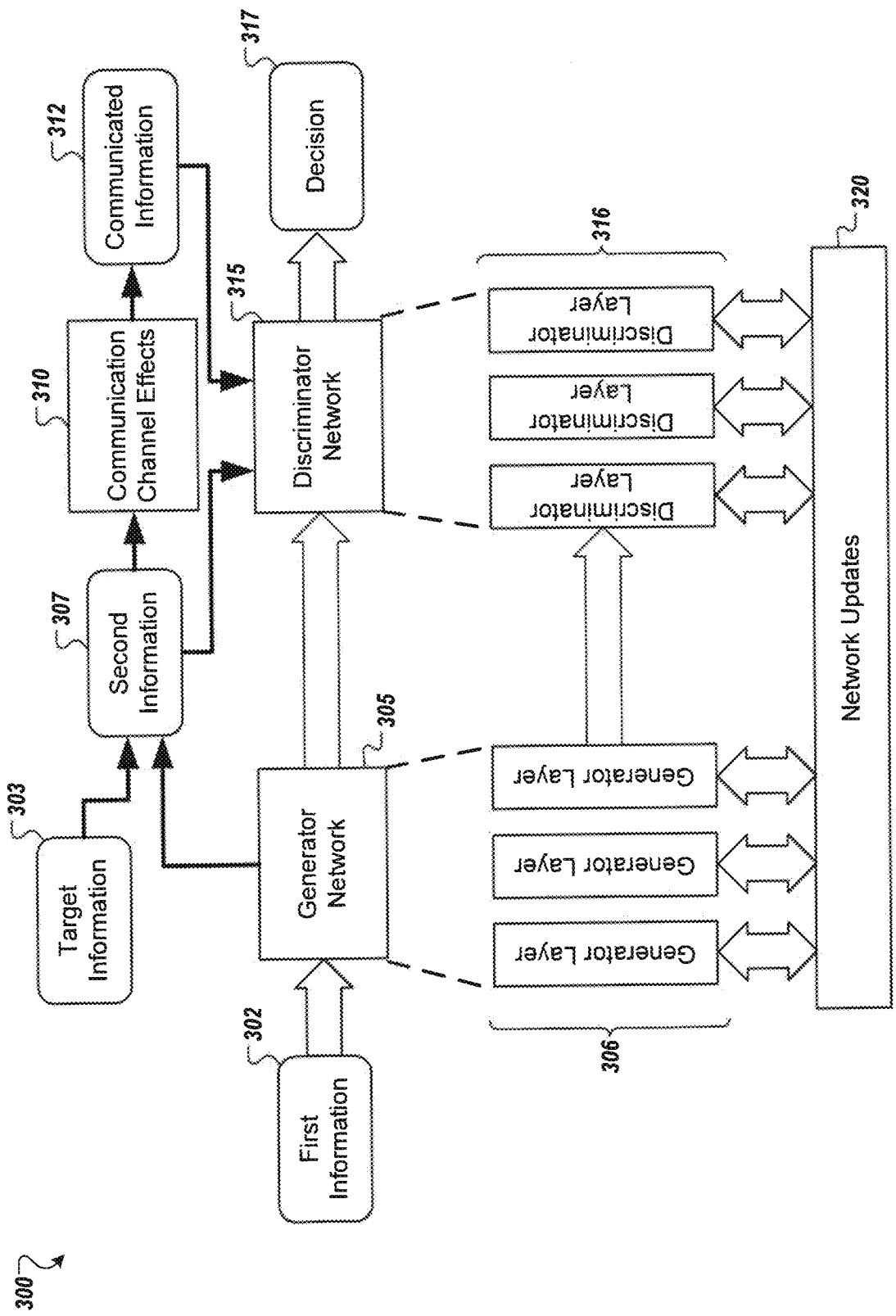
FIG. 3 is a diagram showing an example of a system for training a generator machine-learning network.

FIG. 3 illustrates an example of a system 300 for training a generator machine-learning network. In some implementations, the system 300 is a detailed view of network layer updates used in a system used to train the generator machine-learning network 107 of FIG. 1 or the generator machine-learning network 205 of FIG. 2.

The system 300 shows a network structure of one or more layers that form the generator network 305 and the discriminator network 315. The output of each layer is used as input to the next layer in the network. Each layer of the network generates an output from a received input in accordance with current values of a respective set of parameters. For example, in some implementations, the generator network 305 and/or discriminator network 315 include a plurality of networks that may be collectively or iteratively trained. As such, the first information 302 in FIG. 3 may be the first information 202 in FIG. 2, above, or may be an output of previous one or more layers in the generator network 305. Analogously, decision 317 may represent the discriminator information 222 in FIG. 2, above, or may be an input into subsequent one or more layers in the discriminator network 315. In some instances, networks are not sequential in nature, leveraging connections between various layers or neurons which bypass or route through a plurality of possible architectures.

During training, the generator network 305 and/or discriminator network 315 are trained to learn generating and/or discriminating techniques for communicating over various types of communications channels. During deployment, the generator network 305 (having been trained) may be implemented to produce a communications signal for transmission. Alternatively, in some scenarios of deployment, a deployed generator may utilize simplified generative mappings based on results of training the generator network 305 and/or discriminator network 315. In the latter scenario, the generator network 305 and/or discriminator network 315 is only utilized during training, and provide learned generative techniques that may be utilized in more simplified generators that are deployed in real-world systems.

In the example of FIG. 3, the generator network 305 and discriminator network 315 are implemented using a neural network structure 306 and 316, respectively. In the scenario of a communications signal generator structure, the generator 305 and discriminator 315 are jointly trained to learn information generation that best matches the target information 303. During training, the generator network 305 and/or discriminator network 315 may be updated by a network update process 320.

The generator network 305 produces second information 307. The second information can also be produced form the target information 303. The second information can either become communicated information 312 by communications channel effects 310 or be sent to the discriminator network 315. The discriminator network 315 can receive three variations of information including second information generated from the generator network 305, second information generated from the target information 303, or communicated information 312 derived from either forms of second information.

In general, the generator network 305 and/or discriminator network 315 may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent neural network (RNN) where sequences of training information may be used in some instances). For example, a recurrent neural network may be a long-short term memory (LSTM) neural network that includes one or more LSTM memory blocks, or a quasi-recurrent neural network (QRNN) which combines elements of convolutional networks with recurrent networks.

Parameters and weight values in the generator network 305 and/or discriminator network 315 may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute both the encoder 305 and the discriminator 315, as shown in the example of FIG. 3. The specific structure for the networks may be explicitly specified at design time, or may be selected from a plurality of possible architecture candidates to ascertain the best performing candidate.

In some implementations, the generator network 305 may include an output layer that includes a linear regression layer or another layer which seeks to provide regression across desired output value ranges. The discriminator network 315 may include at least one of (i) an output layer that includes a linear layer for regression of decision information 317 in determining the origin of the second information 307 or the communicated information 312, or (ii) a sigmoid or hard-sigmoid activation layer for probability regression or slicing of the discriminator input, or (iii) an activation of a combination of sigmoid expressions such as a SoftMax or hierarchical SoftMax which can compute a probabilistic expression determining the likely origin of the second information 307 or the communicated information 312, or (iv) another form of pseudo-probability or likelihood regression layer at the output of the network.

In some implementations, the generator network 305 and/or discriminator network 315 include one or more layers that implement fixed communications algorithms, such as synchronization, equalization, etc. As such, in some scenarios, the generator network 305 and/or discriminator network 315 may be trained and deployed to learn suitable generative or discriminative techniques based on such fixed layers in the networks. Therefore, in general, the network structure 306 or 316 disclosed herein enables flexible design and training of the generator network 305 and discriminator network 315, for example by incorporating one or more existing algorithms that may be deployed in real-world systems to generate communications signals in conjunction with machine-learning techniques to optimize around those fixed algorithms.

The example of FIG. 3 shows only one possible implementation of a network structure that may be implemented. In general, implementations are not limited to these specific types of layers, and other configurations of layers and non-linearities may be used, such as dense, fully connected, and/or DNN layers, including rectified linear-unit (ReLU), leaky-ReLU, sigmoid, tanh, and others. The network structure 306 or 316 uses these layers to produce a decision 317 based on the input of the second information 307 or the communicated information 312.

The discriminator network 315 can receive as input either the second information 307 or the communicated information 312. The second information can originate from either the target information 303 or the generator network 305. The communicated information 312 is produced by transmitting the second information through a real or simulated communications channel represented by the communications channel effects 310. In some implementations, this includes one or more of the following steps in hardware and propagation: digital to analog conversion, amplification, frequency mixing, filtering, wireless or wired channel propagation effects, noise, or analog to digital conversion. In some implementations, producing the communicated information 312 by transmitting the second information through a real or simulated communications channel also includes additional processing steps, such as change of modulation basis, or other traditional signal processing or modulation or coding operations. The communicated information 312 then represents an altered version of the second information 307, which has been modified by the real or simulated communications channel effects 310.

In some implementations, the communications channel effects 310 model impairment effects, which include various types of impairments in an RF, optical, or acoustic medium and/or transmission and reception components. Channel effects 310 may be implemented during training of the network structure 306 or 316. During evaluation or deployment over a real RF channel, the communications channel effects 310 would be from a real-world communications channel (including possible transmitter and/or receiver effects).

In scenarios of using communications channel effects 310 to model information transmission, the network structure 306 or 316 may implement domain-specific regularization to model communications channel impairment effects. For example, the communications channel effects 310 may include different types of impairments that occur during over-the-air transmission in a wireless RF system, such as additive Gaussian thermal noise, unknown time and rate of arrival, carrier frequency and phase offset, fading, hardware distortions, interference, and/or delay spread in the received signal.

A general design objective for the network structure 306 or 316 may be to obtain a desired decision performance for the decision 317 (e.g., ability to 'fool' the discriminator network 315 by producing either second information or communicated information sufficiently similar to the target information 303), subject to other objectives or constraints. For example, certain realizations of the system may favor reduced power and/or bandwidth, other improved properties of the communications signals transmitted over the channel, or improved computational complexity. As such, the system may evaluate a trade-off between these objectives, which may be used in order to help determine the specific architecture used for generating, discriminating, or other communications tasks.

Figure 4:
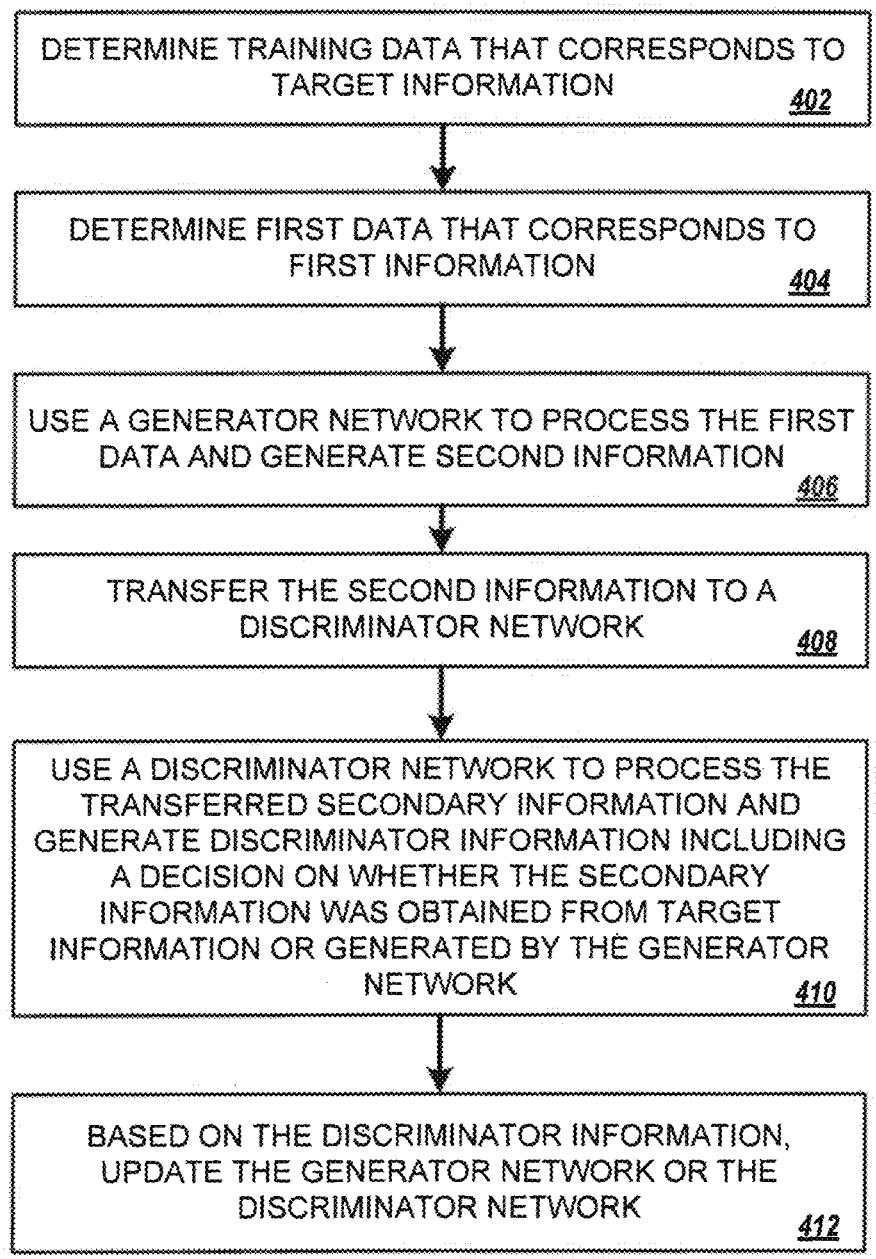
FIG. 4 is a flow diagram illustrating an example of a process for training a generator machine-learning network.

FIG. 4 is a flowchart illustrating an example method 400 of training a generator machine-learning network. In some implementations, the method 400 is performed by one or more components of the system 100, e.g., the generator network 107 or the transmission device 112, or one or more components of the system 200, e.g., the generator network 205, the discriminator network 220, or the optimizer 225. The method 400 is performed by one or more processors, such as one or more CPUs, GPUs, DSPs, FPGAs, ASICs, TPUs, or neuromorphic chips or vector accelerators that execute instructions encoded on a computer storage medium.

The method 400 includes determining training data that corresponds to target information (402). For example, as discussed above, the target information may be examples of a communications signal, simulations of various signals, samples from a closed form distribution over possible values of the second information 207 from FIG. 2, or masked or shaped signals which may represent some desired set of signal properties.

The method 400 includes determining first data that corresponds to first information (404). For example, the first information may represent a list of all possible values of an n-dimensional vector 'z'. In some implementations, 'z' represents random values sampled from a distribution (e.g., uniform distribution, Gaussian distribution, etc.).

The method 400 includes using a generator network to process the first data and generate second information (406). For example, the first information can be used as input into a machine learning network of the generator network 305 as shown in FIG. 3. Each generating layer of item 306 can be used to shape the resulting generated communications signal.

The method 400 includes transferring the second information to a discriminator network (408). The second information can be either generated from a machine learning network or from target information as the system 300 shows. The second information 307 can either originate from the generator network 305 or the target information 303. Furthermore, the second information transferred to the discriminator can, in some cases, be altered either from simulated or real communications channel effects as shown in system 300.

The method 400 includes using a discriminator network to process the transferred secondary information and generate discriminator information including a decision on whether the secondary information was obtained from target information or generated by the generator network (410). As discussed above, a general design objective for the method 400 may be to obtain a desired decision performance for the generator (e.g., ability to 'fool' the discriminator network by producing second information sufficiently similar to the target information).

In some implementations, the method 400 is subject to other objectives or constraints. For example, certain realizations of the system may favor reduced power and/or bandwidth, other improved properties of the communications signals transmitted over the channel, or improved computational complexity. As such, the system may evaluate a trade-off between these objectives, which may be used in order to help determine the specific architecture used for generating, discriminating, or other communications tasks.

The method 400 includes based on the discriminator information, update the generator network or the discriminator network (412). The updating of the generator or the discriminator network may take the form of adjusting weights or parameters within the machine-learning network associated with either the generator network or the discriminator network. Updating the generator network or the discriminator network may also involve performing one or more iterative optimization techniques (e.g., stochastic gradient descent (SGD) or Adam).

Figure 5:
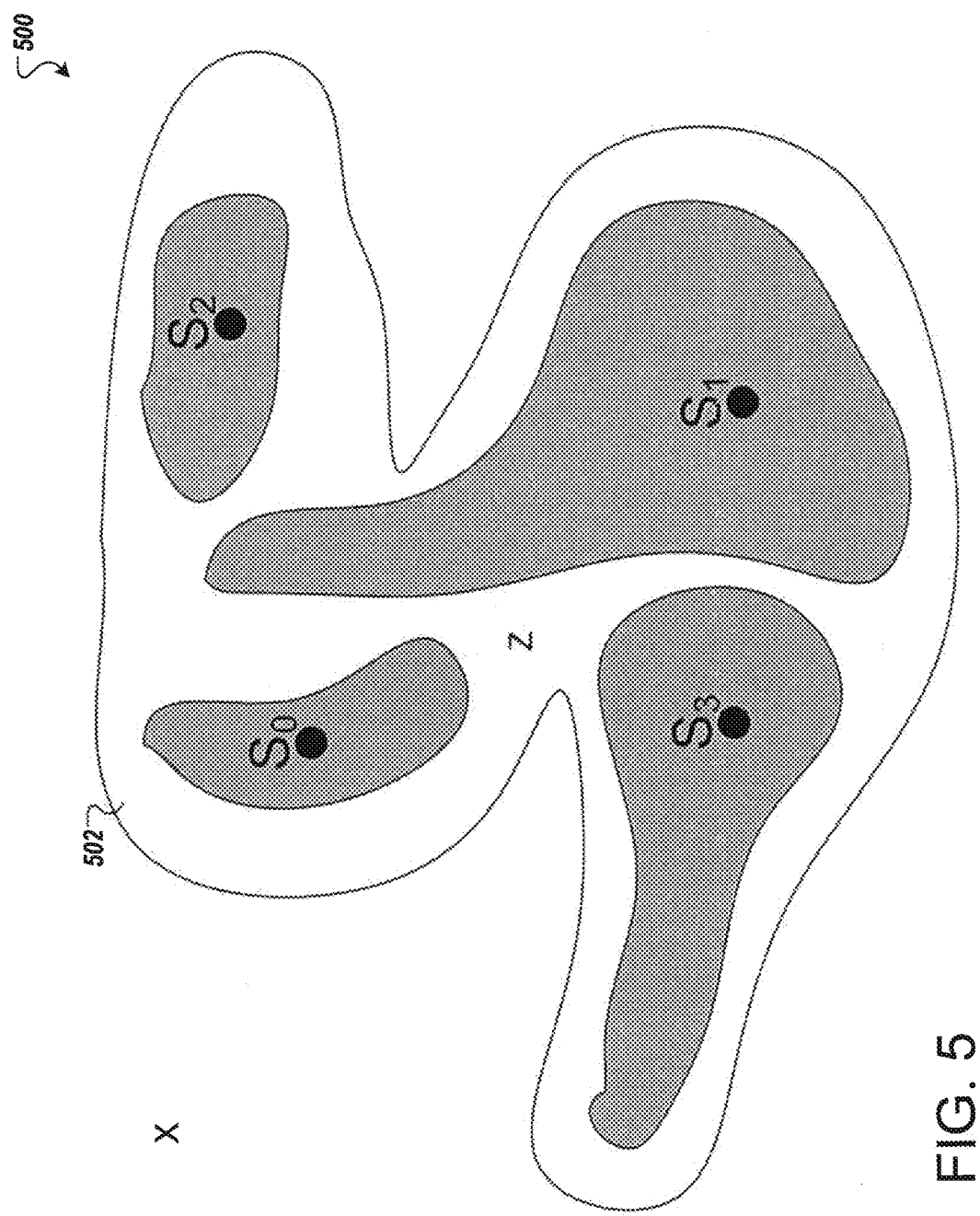
FIG. 5 is a diagram showing an example output of an adversarially trained generator machine-learning network.

FIG. 5 is a diagram illustrating an example 500 that is an output of an adversarially trained generator machine-learning network. The example 500 shows an area 502, which is a plot of a learned distribution in x, formed from latent values in z, which is then partitioned using an encoder into symbol regions within z.

The area 502 illustrates a probability density distribution within the space of possible second information values x. The probability density distribution 502 is formed from a first information or latent space z using a generator network. The distribution 502 within x is sufficiently similar to a target information source used to train the generator network. $S_0$, $S_1$, $S_2$, and $S_3$ represent learned points or regions within the distribution z. An encoder network can be used to encode information with 4 discrete values into the latent space distribution z.

In the case of a deterministic encoder or generator network, fixed points for S values are obtained within this distribution. In the case of a variational encoder or generator network, the corresponding grey regions within the distribution may be formed instead of the singular points in space.

Figure 6:
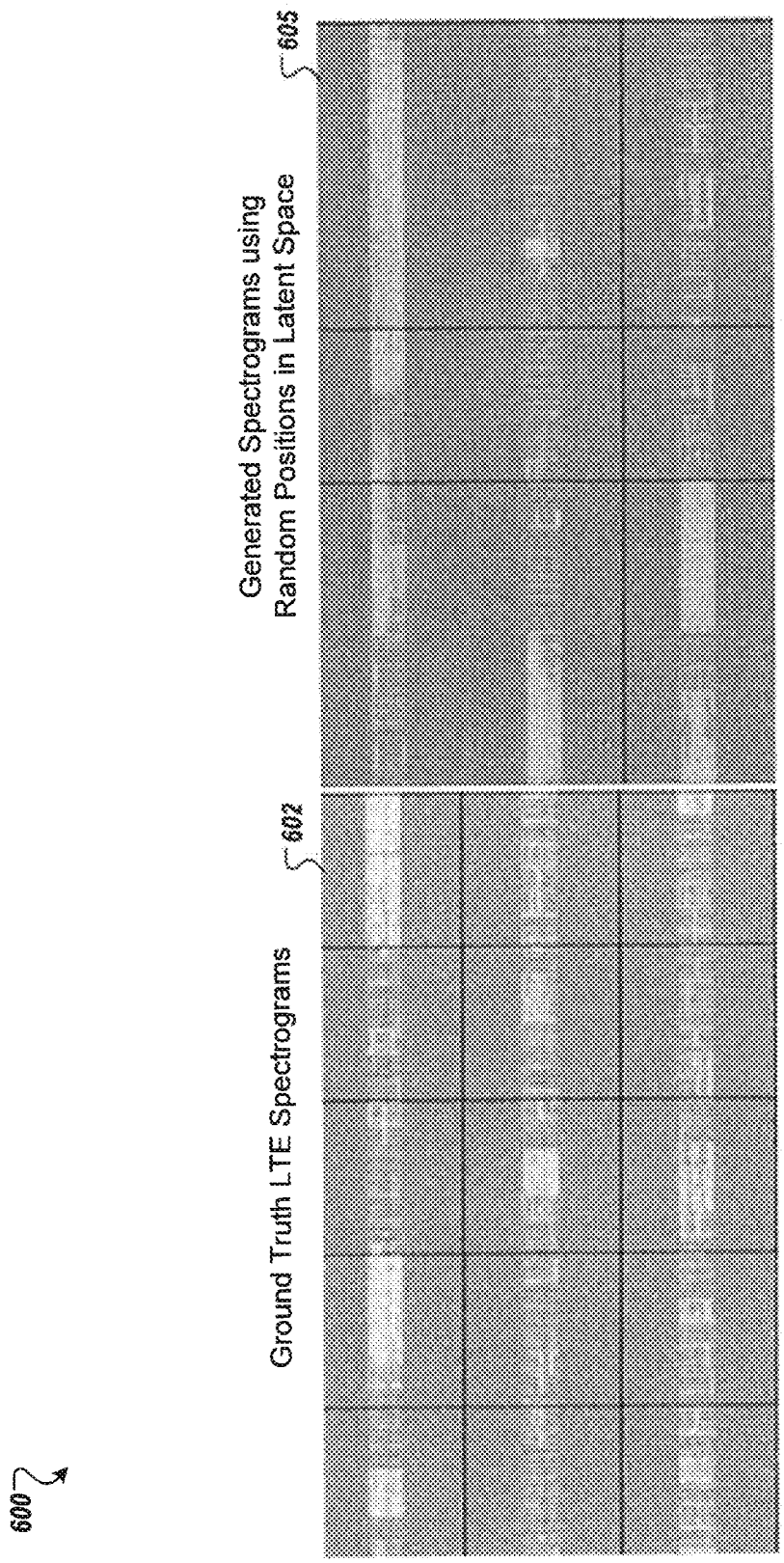
FIG. 6 is an image showing an example of adversarially generated spectrograms showing long-term evolution (LTE) signals.

FIG. 6 illustrates an example 605 of an adversarially generated signal (in this case as a spectrogram) showing long-term evolution (LTE) signals. Item 602 shows the target information used train the variational generator network and enable the variational generator network to create the example 605. Spectrograms are a visual representation of the spectrum of frequencies of a signal as it varies with time.

The comparison 600 illustrates one form of information representation which can be used with a generator network as described in this application. In the time-frequency spectral domain, target information 602 from real world measurement data of a cellular LTE signal transmitted over the air is used to train a generator network.

FIG. 6 demonstrates that, by using the system 200 illustrated in FIG. 2, a generator network produces similar second information 605. The second information shown in 605 from the generator network can be sampled from a random set of first information. The resulting set of examples in time-frequency shown in 605 are novel and yet difficult to discern from those shown in the target information.

Figure 7:
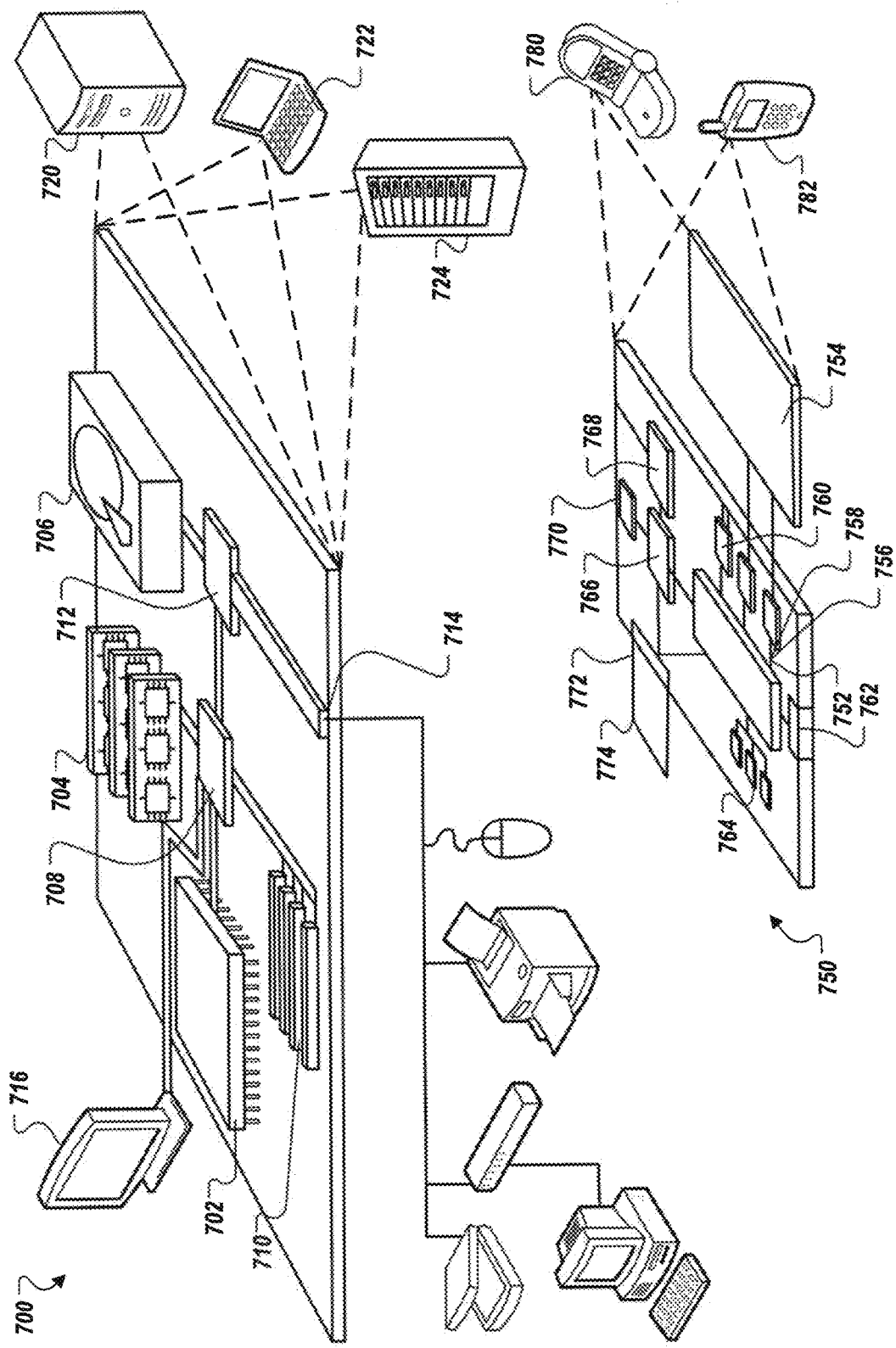
FIG. 7 is a diagram illustrating an example of a computing system used for adversarially generated communications over one or more communications channels.

FIG. 7 is a diagram illustrating an example of a computing system used for adversarially generated communications over one or more communications channels. The computing system includes a computing device 700 and a mobile computing device 750 that can be used to implement the techniques described herein. For example, one or more parts of an encoder machine-learning network system or a decoder machine-learning network system, or a generator machine-learning network system, could be an example of the computing device 700 described here, such as a computer system implemented in any of the machine-learning networks, devices that access information from the machine-learning networks, or a server that accesses or stores information regarding the encoding and decoding performed by the machine-learning networks.

The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 702 is a single threaded processor. In some implementations, the processor 702 is a multi-threaded processor. In some implementations, the processor 702 is a quantum computer.

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine readable mediums (for example, the memory 704, the storage device 706, or memory on the processor 702). The high-speed interface 708 manages bandwidth-intensive operations for the computing device 700, while the low-speed interface 712 manages lower bandwidth-intensive operations. Such allocation of functions is an example only. In some implementations, the high speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714.

The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may include one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 768 using a radio frequency. In addition, short-range communication may occur, such as using a Bluetooth, Wi-Fi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by at least one processor to train at least one machine-learning network to generate information used to communicate over a communications channel, the method comprising:
    determining first information to be used as input for a generator machine-learning network;
    determining target information that includes one or more radio communication signals to be used for training at least one of the generator machine-learning network or a discriminator machine-learning network that is communicably coupled to the generator machine-learning network, wherein the generator machine-learning network and the discriminator machine-learning network are used for communications over the communications channel;
    generating second information by using one of (i) the generator machine-learning network to process the first information and generate the second information including one or more radio communication signals generated by the generator machine-learning network as a function of the first information, or (ii) the target information;
    sending the second information to the discriminator machine-learning network;
    generating discriminator information by processing the transferred second information using the discriminator machine-learning network, wherein generating the discriminator information includes performing a determination by the discriminator machine-learning network whether the transferred second information originated from the generator machine-learning network or the target information;

sending, to an optimizer, decision information indicating the determination performed by the discriminator machine-learning network;

processing, using the optimizer, the decision information using one or more iterative optimization techniques; and updating at least one of the generator machine-learning network or the discriminator machine-learning network based on the optimizer processing the discriminator information and results of the one or more iterative optimization techniques.

2. The method of claim 1, wherein the one or more iterative optimization techniques include a stochastic gradient descent (SGD) or Adam optimization algorithm.

3. The method of claim 1, wherein the transferred second information is an altered version of the second information that is obtained by processing the second information using either a real or simulated communications channel.

4. The method of claim 3, wherein processing the second information comprises modulation, digital to analog conversion, amplification, frequency mixing, filtering, wireless or wired channel propagation effects, noise, analog to digital conversion, change of modulation basis, or other traditional signal processing, modulation, or coding operations.

5. The method of claim 1, further comprising:

deploying the generator machine-learning network in a communications system in conjunction with signal encoding performed by an encoder machine-learning network;

determining an objective function using a measure of distance between input information to the encoder machine-learning network and output information produced from a decoder machine-learning network that is communicably coupled to the encoder machine-learning network, wherein the output information is produced as a function of a transmission received from the encoder machine-learning network, the transmission being based on the input information;

calculating a rate of change of the objective function relative to variations in at least one of the encoder machine-learning network or the decoder machine-learning network;

selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network.

6. The method of claim 5, wherein the encoder machine-learning network and the decoder machine-learning network are jointly trained as an auto-encoder to learn communications over the communications channel, and wherein the auto-encoder comprises at least one channel-modeling layer representing effects of the communications channel on transmitted waveforms.

7. The method of claim 6, wherein the communications channel comprises at least one of a radio communications channel, an acoustic communications channel, or an optical communications channel.

8. The method of claim 1, wherein updating at least one of the generator machine-learning network or the discriminator machine-learning network comprises at least one of:

updating at least one generating network weight or network connectivity in one or more layers of the generator machine-learning network, or updating at least one discriminating network weight or network connectivity in one or more layers of the discriminator machine-learning network.

9. The method of claim 1, wherein at least one of the generator machine-learning network or the discriminator machine-learning network comprises at least one of a deep dense neural network (DNN), a convolutional neural network (CNN), or a recurrent neural network (RNN) comprising parametric multiplications, additions, and non-linearities.

10. The method of claim 1, wherein the generator machine-learning network is trained to generate at least one of $4^{th}$ Generation Long-term Evolution (4G LTE), $5^{th}$ Generation New Radio (5G NR), or $6^{th}$ Generation (6G) cellular communications signals, Wi-Fi signals, satellite signals, auditory signals, visual signals, or radar signals.

11. A method of transmitting and receiving information through a communications channel, the method comprising:

determining first information to be used as input for a generator machine-learning network;

determining target information that includes one or more radio communication signals to be used for training at least one of the generator machine-learning network or a discriminator machine-learning network that is communicably coupled to the generator machine-learning network, wherein the generator machine-learning network and the discriminator machine-learning network are used for communications over the communications channel;

generating second information by using one of (i) the generator machine-learning network to process the first information and generate the second information including one or more radio communication signals generated by the generator machine-learning network as a function of the first information, or (ii) the target information;

sending the second information to the discriminator machine-learning network;

generating discriminator information by processing the transferred second information using the discriminator machine-learning network, wherein generating the discriminator information includes performing a determination by the discriminator machine-learning network whether the transferred second information originated from the generator machine-learning network or the target information;

sending, to an optimizer, decision information indicating the determination performed by the discriminator machine-learning network;

processing, using the optimizer, the decision information using one or more iterative optimization techniques; and updating at least one of the generator machine-learning network or the discriminator machine-learning network based on the optimizer processing the discriminator information and results of the one or more iterative optimization techniques.

12. The method of claim 11, wherein the one or more iterative optimization techniques include a stochastic gradient descent (SGD) or Adam optimization algorithm.

13. The method of claim 11, wherein the transferred second information is an altered version of the second information that is obtained by processing the second information using either a real or simulated communications channel.

14. The method of claim 13, wherein processing the second information comprises modulation, digital to analog conversion, amplification, frequency mixing, filtering, wireless or wired channel propagation effects, noise, analog to digital conversion, change of modulation basis, or other traditional signal processing, modulation, or coding operations.

15. The method of claim 11, further comprising:
deploying the generator machine-learning network in a communications system in conjunction with signal encoding performed by an encoder machine-learning network;
determining an objective function using a measure of distance between input information to the encoder machine-learning network and output information produced from a decoder machine-learning network that is communicably coupled to the encoder machine-learning network, wherein the output information is produced as a function of a transmission received from the encoder machine-learning network, the transmission being based on the input information;
calculating a rate of change of the objective function relative to variations in at least one of the encoder machine-learning network or the decoder machine-learning network;
selecting, based on the calculated rate of change of the objective function, at least one of a first variation for the encoder machine-learning network or a second variation for the decoder machine-learning network; and
updating at least one of the encoder machine-learning network or the decoder machine-learning network based on the at least one of the selected first variation for the encoder machine-learning network or the selected second variation for the decoder machine-learning network.

16. The method of claim 15, wherein the encoder machine-learning network and the decoder machine-learning network are jointly trained as an auto-encoder to learn communications over the communications channel, and
wherein the auto-encoder comprises at least one channel-modeling layer representing effects of the communications channel on transmitted waveforms.

17. The method of claim 16, wherein the communications channel comprises at least one of a radio communications channel, an acoustic communications channel, or an optical communications channel.

18. The method of claim 11, wherein updating at least one of the generator machine-learning network or the discriminator machine-learning network comprises at least one of:
updating at least one generating network weight or network connectivity in one or more layers of the generator machine-learning network, or
updating at least one discriminating network weight or network connectivity in one or more layers of the discriminator machine-learning network.

19. The method of claim 11, wherein at least one of the generator machine-learning network or the discriminator machine-learning network comprises at least one of a deep dense neural network (DNN), a convolutional neural network (CNN), or a recurrent neural network (RNN) comprising parametric multiplications, additions, and non-linearities.

20. The method of claim 11, wherein the generator machine-learning network is trained to generate at least one of 4th Generation Long-term Evolution (4G LTE), 5th Generation New Radio (5G NR), or 6th Generation (6G) cellular communications signals, Wi-Fi signals, satellite signals, auditory signals, visual signals, or radar signals.

21. A system comprising:
at least one processor; and
at least one computer memory coupled to the at least one processor having stored thereon instructions which, when executed by the at least one processor, cause the at least one processor to perform operations comprising:
determining first information to be used as input for a generator machine-learning network;
determining target information that includes one or more radio communication signals to be used for training at least one of the generator machine-learning network or a discriminator machine-learning network that is communicably coupled to the generator machine-learning network, wherein the generator machine-learning network and the discriminator machine-learning network are used for communications over a communications channel;
generating second information by using one of (i) the generator machine-learning network to process the first information and generate the second information including one or more radio communication signals generated by the generator machine-learning network as a function of the first information, or (ii) the target information;
sending the second information to the discriminator machine-learning network;
generating discriminator information by processing the transferred second information using the discriminator machine-learning network, wherein generating the discriminator information includes performing a determination by the discriminator machine-learning network whether the transferred second information originated from the generator machine-learning network or the target information;
sending, to an optimizer, decision information indicating the determination performed by the discriminator machine-learning network;
processing, using the optimizer, the decision information using one or more iterative optimization techniques; and
updating at least one of the generator machine-learning network or the discriminator machine-learning network based on the optimizer processing the discriminator information and results of the one or more iterative optimization techniques.

22. The system of claim 21, wherein the one or more iterative optimization techniques include a stochastic gradient descent (SGD) or Adam optimization algorithm.

23. The system of claim 21, wherein the transferred second information is an altered version of the second information that is obtained by processing the second information using either a real or simulated communications channel.

24. The system of claim 23, wherein processing the second information comprises modulation, digital to analog conversion, amplification, frequency mixing, filtering, wireless or wired channel propagation effects, noise, analog to digital conversion, change of modulation basis, or other traditional signal processing, modulation, or coding operations.

25. The system of claim 21, further comprising:
deploying the generator machine-learning network in a communications system in conjunction with signal encoding performed by an encoder machine-learning network;
determining an objective function using a measure of distance between input information to the encoder machine-learning network and output information produced from a decoder machine-learning network that is communicably coupled to the encoder machine-learning network, wherein the output information is produced as a function of a transmission received from the encoder machine-learning network, the transmission being based on the input information;
calculating a rate of change of the objective function relative to variations in at least one of the encoder machine-learning network or the decoder machine-learning network;
selecting, based on the calculated rate of change of the objective function, at least one of a first variation for the encoder machine-learning network or a second variation for the decoder machine-learning network; and
updating at least one of the encoder machine-learning network or the decoder machine-learning network based on the at least one of the selected first variation for the encoder machine-learning network or the selected second variation for the decoder machine-learning network.

26. The system of claim 25, wherein the encoder machine-learning network and the decoder machine-learning network are jointly trained as an auto-encoder to learn communications over a communications channel, and
wherein the auto-encoder comprises at least one channel-modeling layer representing effects of the communications channel on transmitted waveforms.

27. The system of claim 26, wherein the communications channel comprises at least one of a radio communications channel, an acoustic communications channel, or an optical communications channel.

28. The system of claim 21, wherein updating at least one of the generator machine-learning network or the discriminator machine-learning network comprises at least one of:
updating at least one generating network weight or network connectivity in one or more layers of the generator machine-learning network, or
updating at least one discriminating network weight or network connectivity in one or more layers of the discriminator machine-learning network.

29. The system of claim 21, wherein at least one of the generator machine-learning network or the discriminator machine-learning network comprises at least one of a deep dense neural network (DNN), a convolutional neural network (CNN), or a recurrent neural network (RNN) comprising parametric multiplications, additions, and non-linearities.

30. The system of claim 21, wherein the generator machine-learning network is trained to generate at least one of 4th Generation Long-term Evolution (4G LTE), 5th Generation New Radio (5G NR), or 6th Generation (6G) cellular communications signals, Wi-Fi signals, satellite signals, auditory signals, visual signals, or radar signals.

* * * * *